Figure 1:
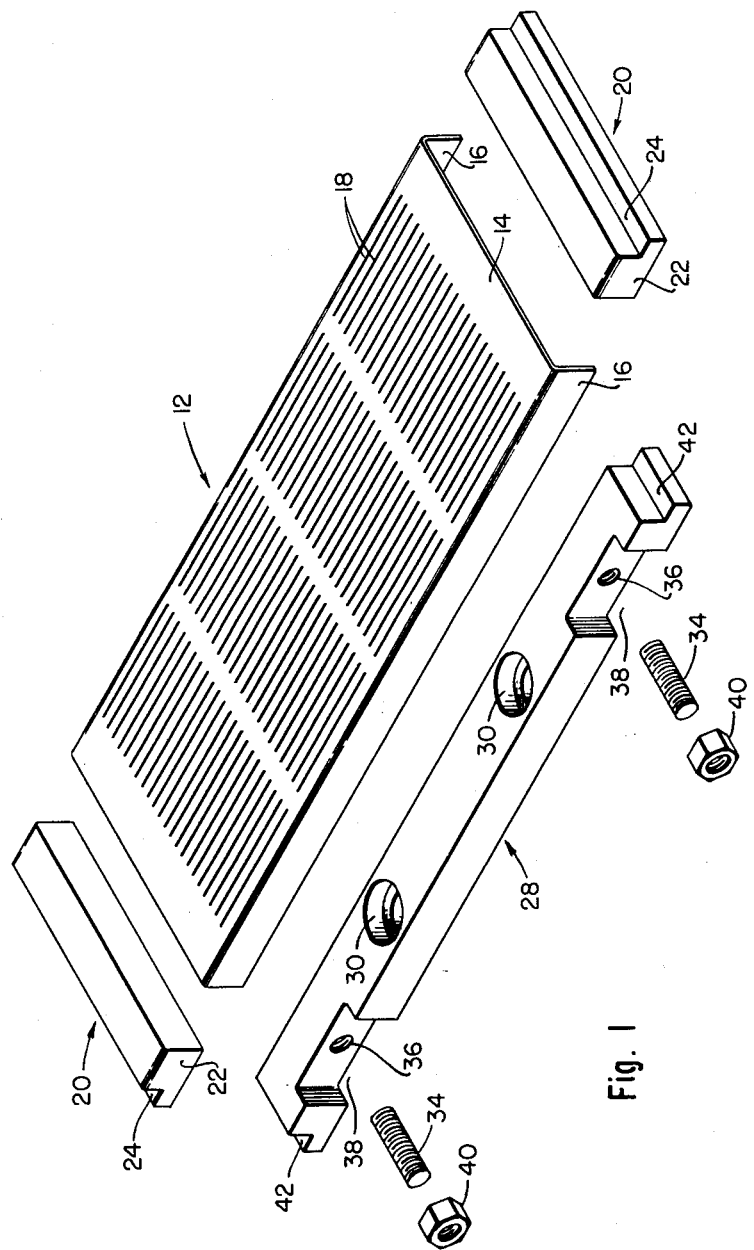

March 6, 1956  F. DUSTAN  2,737,086
SCREEN PLATE

Filed May 18, 1953  2 Sheets-Sheet 1

INVENTOR.
FRANK DUSTAN
BY Kenway Jenney
Witter & Hildreth
ATTORNEYS

March 6, 1956
F. DUSTAN
2,737,086
SCREEN PLATE
Filed May 18, 1953
2 Sheets-Sheet 2
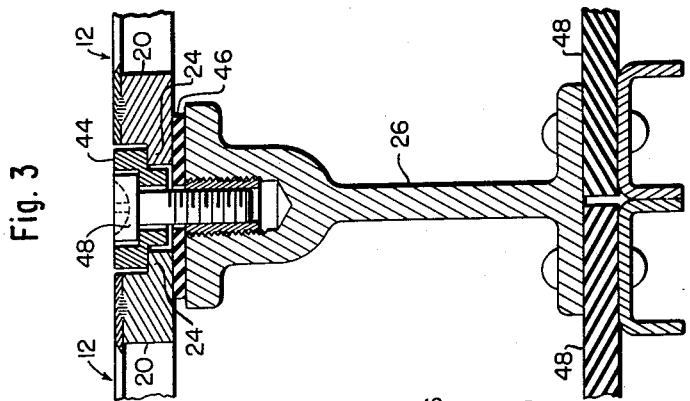
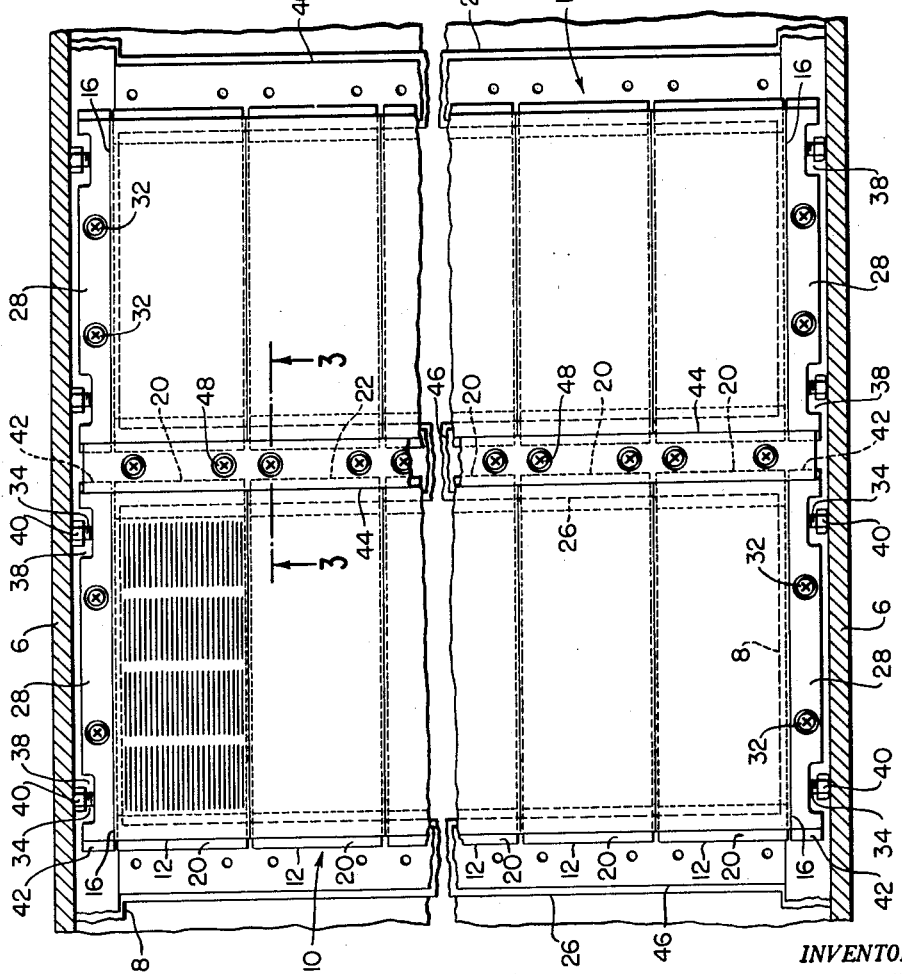
INVENTOR.
FRANK DUSTAN
BY Kenway Jenney
Witter & Hildreth
ATTORNEYS United States Patent Office 2,737,086
Patented Mar. 6, 1956

2,737,086

SCREEN PLATE

Frank Dustan, Fitchburg, Mass.

Application May 18, 1953, Serial No. 355,811

3 Claims. (Cl. 92—31)

The present invention relates to screen plates for papermaking machines and is concerned with improvements in the sheet metal plates of the general type described in my Patent 2,015,141 dated September 24, 1935 (Reissue 20,533).

The plate shown in the above patent differs from the old form of cast bronze plates, in that it is made from sheet metal, preferably stainless steel, in which a number of longitudinal saw cuts are provided. The stainless steel plate has been found to be exceptionally useful in the construction and operation of paper-making machines.

The principal object of the present invention is to provide improvements in the construction of sheet metal plates with a view toward reducing the cost of manufacture, increasing the strength, and providing for simpler maintenance and repair.

The construction shown in my reissue patent comprises a number of channels mounted upon a frame to form a single plate, a number of such single plates being adapted for assembly into a vat. According to the present invention, the screen plates are likewise constructed of a plurality of channels, but are arranged to be supported in such a manner that the frame is unncessary. By means of adjustable locking bars, the plates may be securely held within the vat, but individual channels may be readily removed for repair or replacement without the necessity of removing and disassembling the frame.

Other features of the invention consist of certain novel features of construction and combination of arrangements of parts hereinafter described and particularly defined in the claims.

In the accompanying drawings Fig. 1 is an exploded view of a channel and locking bar of an improved screen plate according to the present invention.

Fig. 2 is a plan view on a reduced scale showing the arrangement of the plates in the vat; and Fig. 3 is a section on line 3—3 of Fig. 2 showing the manner of securing the plates within the vat.

Referring first to Fig. 2, the sides of the vat are shown at 6. The vat is provided with rails or sills 8 along the sides for mounting of the plates as will hereinafter be described. The plates according to the present invention are shown generally at 10 and each comprises a plurality of channel sections 12 now to be described in detail.

Referring to Fig. 1, each channel section 12 comprises a web portion 14 and two downwardly turned flange portions 16. The channel is preferably constructed of stainless steel and is provided with longitudinal saw cuts 18 after the general manner of my above-mentioned reissue patent.

At each end of the channel there is provided a filler 20 having sidewalls 22 of the same height as the internal height of the flanges 16. The filler 20 has a ledge portion 24 of reduced height which projects outwardly from the end of the channel. The filler 20 at each end is welded to the channel 12, preferably by spot welding between the web 14 and the upper surface of the piece 20.

As shown in Fig. 2, a screen plate comprises a plurality, usually ten, of the channels 12 arranged side-by-side in the vat. The channels of any screen plate are not rigidly secured together, but the filler pieces 20 are supported by the stringers 26 of the vat as illustrated in Fig. 3, in a manner to be described presently.

Each screen plate, which is composed of a plurality of channels, is provided with two locking bars, one disposed at each side of the vat. The bars are shown at 28. Each comprises a bar adapted to be supported by the side rail 8 of the vat, each bar having two counterbored openings 30 to receive shoulder-headed screws 32. The holes are made over-sized with respect to the screws to allow the bar 28 to be adjusted against the outer vertical faces of the two end channels. This adjustment is provided by means of threaded studs 34 which are received in threaded openings 36. Preferably the bar is recessed in its outer side as indicated at 38. Nuts 40 are received on the studs 34 and are adapted to bear against the sidewalls 6 of the vat. By this means, the inner surface of the bar may be brought into firm contact with the flange 16 of the outermost channel section of the screen plate.

Each bar 28 is of the same height as the flanges 16 of the channel sections and is provided at its end with a projecting portion 42 of reduced height which is adapted to align with the projecting ledge portions 24 of the filler pieces of the entire screen plate assembly.

A plurality of plates are assembled in the vat as indicated in Figs. 2 and 3. A transverse securing member in the form of a T bar 44 of conventional construction engages the projecting ledge portions 24 of the filler pieces of the complete screen assembly on each side. As shown in Fig. 3, the filler pieces 20 are supported on the stringer 26 of the vat, a gasket 46 being interposed between the row of filler pieces and the stringer. The T bar 44 is counterbored to receive shoulder headed screws 48 suitably threaded into the stringers 26.

At the bottom the pulsating diaphragms 48 are provided in the usual manner.

In some vat constructions a bevel batten is used in place of the T bar and in that case the end of the filler piece, instead of being provided with a flat ledge portion 24, may be suitably beveled to conform to the batten. The T bar construction is, however, preferred.

In assembling the plates, a single plate is made up by laying the channels 12 into place side-by-side with their ends supported by the stringers 26. The locking bars 28 are then put in place and are held loosely by means of the screws 32. Adjacent plates are also mounted in the same manner, after which the T bars 44 are put in place and loosely secured by the bolts 48. The nuts 40 are then adjusted to bring the vertical walls of the bars 28 tightly against the flanges of the outermost channel of each screen plate, thereby tightly securing the channels in position and causing the flanges 16 of adjacent channels to lie in close contact whereby the webs 14 of the entire plate form, in effect, a smooth, continuous surface. Thereafter the T bar bolts 48 and the screws 32 are taken up tightly to retain the plates in secure position against the pulsating pressure.

The present invention offers all the advantages of, and additional advantages of strength and ease of maintenance and repair over, the construction shown in my above-mentioned reissue patent and other existing types of screen plates. In particular, the greater strength is due to the fact that the flanges 16 are made the full depth of the plate, as distinguished from the construction of my reissue patent in which the flanges are received in slotted frame members.

In the present invention the frame has been entirely eliminated. The use of a frame requires accurate welding, preferably with the use of jigs. Furthermore, the channels were formerly riveted to the frame, which tended to weaken the structure. Any twisting or warping of the frame also resulted in inaccurate positioning of the plate within the vat. The frameless construction of the present invention provides for easier assembly. Furthermore, the maintenance difficulties are greatly reduced, since if a channel becomes broken or damaged, it may be readily replaced merely by removing the fastener bars 44 and backing off the locking bars 28, whereas a frame type plate had to be completely removed and a new channel had to be secured in the frame. The breakage problem is a serious one because of the intense vibration under which screen plates are operated and the high pulsating pressures in the normal operation of the vat.

It is also necessary to remove screen plates at intervals for cleaning off slime and also for passivating which involves immersing the plates in a nitric acid solution. The individual channels are easily removed and handled for the cleaning and passivating operations.

Having thus described the invention, I claim:

1. A screen plate comprising a plurality of separate individual channels, each channel comprising a web of sheet metal having two downwardly extending flanges, the web being provided with longitudinal slits, each channel having at its ends filler pieces of the height of the flanges, each filler piece having projections extending outwardly from the web and of less height than the flanges, the channels being arranged side-by-side with flanges of adjacent channels abutting, and the projections of the fillers of the several channels being aligned to be engaged by a transverse securing member.

2. A screen plate comprising a plurality of separate individual channels, each channels comprising a web of sheet metal having two downwardly extending flanges, the web being provided with longitudinal slits, each channel having at its ends filler pieces of the height of the flanges, each filler piece having projections extending outwardly from the web and of less height than the flanges, the channels being arranged side-by-side with flanges of adjacent channels abutting with said projections in alignment, a pair of locking bars adapted to be secured on the sills of a vat and engaging the outermost channels of the plate, and adjusting means for moving said locking bars inwardly against the flanges of the outermost channels.

3. A screen plate assembly comprising a plurality of screen plates, each screen plate having a plurality of separate individual channels, each channel comprising a web of sheet metal having two downwardly extending flanges, the web having longitudinal slits, each channel having at its ends filler pieces of the height of the flanges, each filler piece having projections extending outwardly from the web and of less height than the flanges, a plurality of channels being arranged side-by-side with flanges abutting to form a screen plate, locking bars for each screen plate to be secured to the sills of a vat, adjustable means for moving said locking bars inwardly against the flanges of the outermost channels, a plurality of screen plates being mounted in end-to-end relationship, and a transverse securing member engaging the projections of the filler pieces of adjacent plates.

References Cited in the file of this patent

UNITED STATES PATENTS

| | | |
|---|---|---|
| 694,900 | Tibbetts | Mar. 4, 1902 |
| 918,261 | Bayley | Apr. 13, 1909 |
| 959,979 | Webb | May 31, 1910 |
| 2,015,139 | Dustan | Sept. 24, 1935 |